United States Patent [19]

Jacobson

[11] Patent Number: 4,929,261

[45] Date of Patent: May 29, 1990

[54] HEPA FILTER MODULE

[76] Inventor: Earl B. Jacobson, 501 S. Shore Dr., Crystal Lake, Ill. 60014

[21] Appl. No.: 329,573

[22] Filed: Mar. 28, 1989

[51] Int. Cl.[5] .............. B01D 46/00

[52] U.S. Cl. .............. 55/213; 55/321; 55/500; 55/DIG. 3

[58] Field of Search .............. 55/DIG. 3, 213, 500, 55/318-323

[56] References Cited

U.S. PATENT DOCUMENTS

| | | | |
|---|---|---|---|
| 4,312,645 | 1/1982 | Marros et al. | 55/213 |
| 4,613,348 | 9/1986 | Natale | 55/318 |
| 4,682,448 | 7/1987 | Healey | 55/356 X |
| 4,723,971 | 2/1988 | Caldas | 55/356 X |
| 4,726,825 | 2/1988 | Natale | 55/318 |
| 4,765,352 | 8/1988 | Strieter | 55/385.2 |

*Primary Examiner*—Charles Hart
*Attorney, Agent, or Firm*—Leydig, Voit & Mayer

[57] ABSTRACT

A HEPA-type filter including a cannister body with an inlet and outlet coupled through a filter unit having at least one prefilter and a HEPA-type filter therein. The prefilter protects the HEPA-type filter from moisture and clogging. The module can include a fume hood to prevent hazardous material from escaping when a cannister liner or bag is replaced. The module can form part of the vacuum system for a hazardous waste removal system and is coupled to a conventional separate vacuum source for operation thereof.

7 Claims, 1 Drawing Sheet

HEPA FILTER MODULE

BACKGROUND OF THE INVENTION

This invention relates generally to hazardous waste removal vacuum systems and more particularly to an improved filter module to protect the HEPA filter in the waste removal vacuum system.

Numerous prior art waste removal systems have been utilized for a considerable period of time for removing waste from a closely defined work area in which the contaminants or hazardous wastes are confined. The worker is protected from the wastes in various manners, since the wastes are confined inside of the system and the worker works in the system, but avoids direct contact with the wastes, for example, by utilizing the well-known glove bag concept.

One particular application for glove bag waste removal systems is in removing coatings or insulation from pipes which material is or contains asbestos. The prior art glove bags are secured and sealed around the pipes at the tops of the bags, such as by wrapping the open ends of the bag top around the pipe and taping the openings shut. The bags are utilized to remove the asbestos material and then are removed from the pipe and sealed for disposal. Typically, the bags are placed in a second bag for disposal. The bags and other removal systems are utilized under negative pressure and typically include one or more openings for vacuum lines and for water spray lines or nozzles for wetting down the material as an extra safety precaution.

Two somewhat related glove bag waste removal systems and applications are disclosed in application Ser. No. 001,074, entitled "Hazardous Waste Glove Bag Removal System" and Ser. No. 001,075, entitled "Glove Bag Waste Removal System For Asbestos Impregnated Brakes", both filed Jan. 7, 1987, the disclosures of which are incorporated herein by reference.

In the prior art, the vacuum systems which achieve the negative pressure, typically contain an expensive HEPA or HEPA-type filter. The HEPA-type filters are very heavy duty and can be utilized to pull 80–120 inches of water column of vacuum. The filters are intended for utilization with wet or dry material, however, the moisture added to the hazardous material, such as insulation, can clog the filters. If the filter is clogged, the filter can be blown out. This causes several problems, since the filters are expensive and because the hazardous materials can be released into the environment. The HEPA-type filters therefore are very expensive because they are constructed to withstand a very high pressure differential on the order of 20–30 inches of water column of vacuum, to prevent their collapse. Additionally, some of the prior art wet HEPA-type filter systems utilize float valves to try to prevent the water reaching the filter. The filters also typically are an integrated part of a special vacuum apparatus, which also adds an additional cost to the waste removal system.

It therefore would be desirable to provide a waste removal vacuum system, which can utilize the HEPA-type filter, but which is not easily clogged and also provides a structure which is durable and has a long use life. Further, the use of a conventional vacuum source would also be desirable to further decrease the system cost.

SUMMARY OF THE INVENTION

The above and other disadvantages of prior art hazardous waste removal vacuum systems and techniques are overcome in accordance with the present invention by providing a separate HEPA filter module, which includes a prefilter for the HEPA filter and serves as a separate module allowing a standard vacuum system to be utilized therewith.

The filter module includes at least one and can include two prefilters, which protect the HEPA-type filter and allow an inexpensive HEPA-type filter to be utilized. Further, the module avoids a high pressure differential across the filter, which pressure differential can be monitored. The filter module includes a vacuum attachment to the waste removal system which serves as an input to the module. After the air has been filtered through the prefilter or filters and the HEPA-type filter, it is coupled by a second vacuum attachment to a conventional vacuum system. The module can include a fume hood to further prevent release of the hazardous material. The module includes a replaceable waste bag or container, which retains the wet or dry hazardous waste removed by the vacuum system.

DESCRIPTION OF THE PREFERRED EMBODIMENTS

Figure 1:
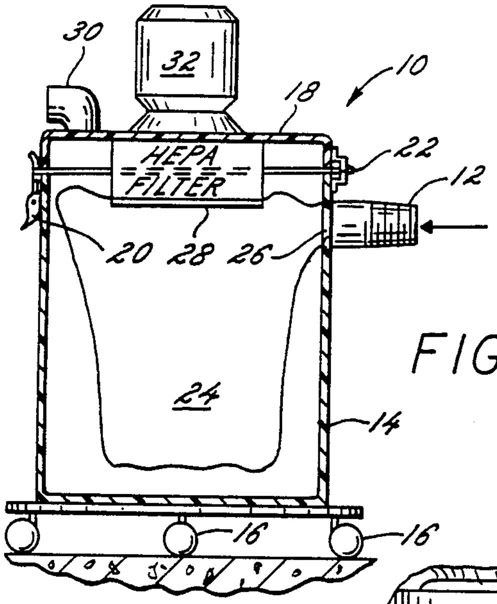
FIG. 1 is a partial side sectional view of a prior art vacuum apparatus.

Referring to FIG. 1, a prior art vacuum apparatus is designated generally by the reference numeral 10. The vacuum 10 includes an inlet 12, which is coupled to a waste removal system which is to be kept under negative pressure (not illustrated).

The vacuum 10 includes a cannister or outer shell 14 and is generally mobile, including rollers or wheels 16. The shell 14 includes a sealable top or lid 18, secured by a latch mechanism 20 and pivotable to an open position on a hinge 22, in a conventional manner.

The vacuum 10 further includes a liner or disposal filler bag 24, which again is secured and disposed within the shell 14 in a conventional manner and includes an opening 26, which mates to and communicates with the inlet 12.

The lid 18 has a HEPA-type filter 28 mounted directly thereto and communicating directly on an inlet side with the bag 24 and on an outlet side with a vacuum outlet 30 to exhaust the filtered air from the vacuum apparatus 10. The filter bag 24 generally is secured to the filter 28 in a conventional manner and the air first passes therethrough. The negative air pressure or vacuum is provided by a conventional motor 32. The filter 28 also can be mounted on a separate flange (not illustrated).

In operation, the material passes into the opening 26 and hence the bag 24 from the inlet 12, t hen through the bag 24 into the filter 28. Initially, if the material is dry, the vacuum 10 should operate perfectly well. If the bag 24 becomes too full or the material is wet, it is possible that the HEPA-type filter 28 can become clogged and blow out. A water level protector (not illustrated) can be provided for the HEPA-type filter 28 in the vacuum 10, since as above mentioned, the filters 28 are expensive and if the filter 28 blows out, hazardous material can be blown into the environment through the exhaust 30. The water level protectors or floats do not operate as well as is desirable.

Figure 2:
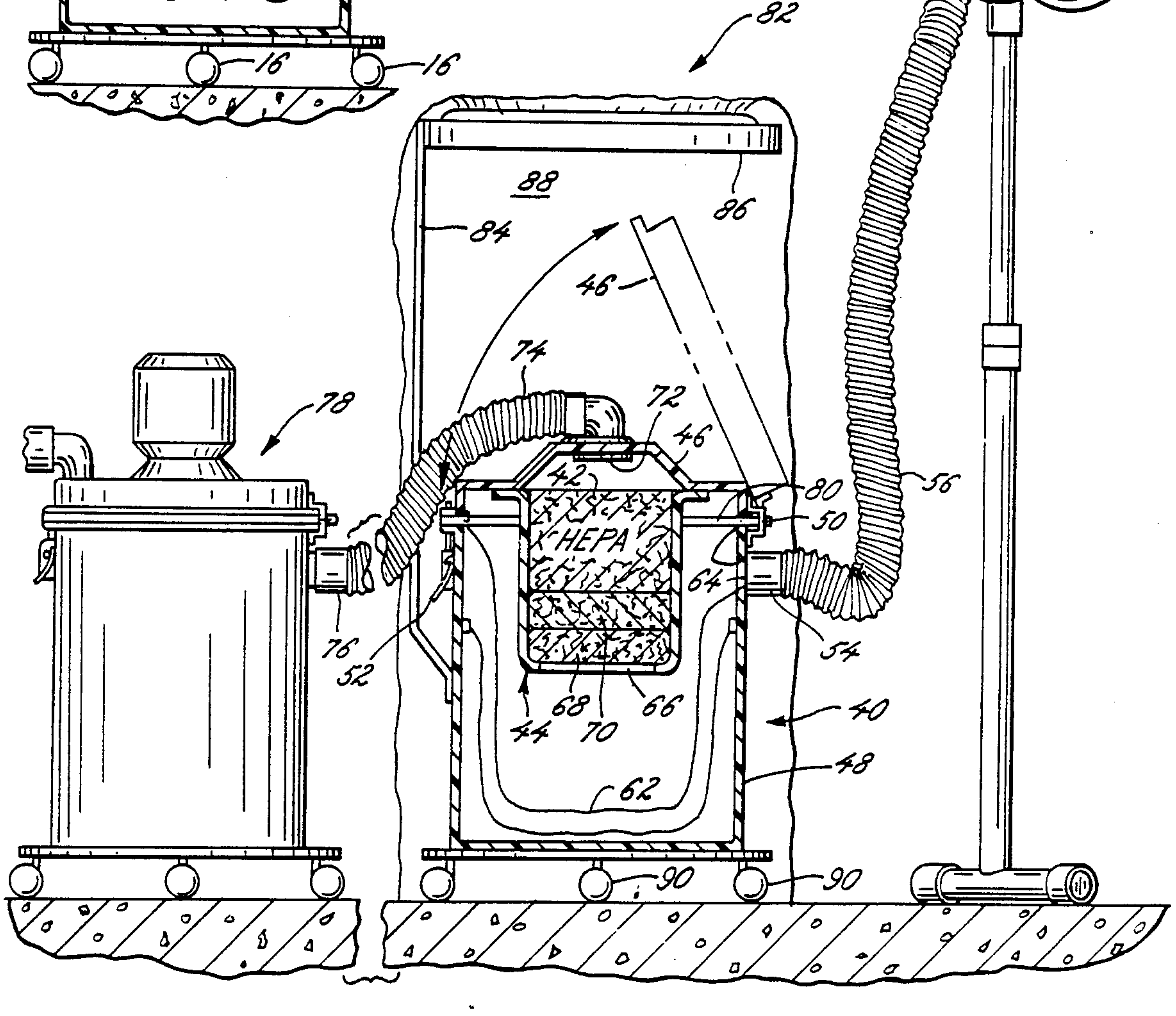
FIG. 2 is a partial side sectional and perspective view of one embodiment of the HEPA-type filter module and vacuum system of the present invention.

The problems caused by the design of the vacuum 10 are solved by the filter module of the invention, a first embodiment of which is designated generally by the reference numeral 40 in FIG. 2. The module 40 includes a low pressure differential HEPA-type filter 42, which is mounted in a filter unit 44, which again can be mounted onto a sealable and pivotable lid 46.

The lid 46 is mounted onto a cannister or shell 48 by a hinge 50. The lid 46 is shown in the open position in phantom. The lid 46 again is sealed shut to the cannister 48 by a latching mechanism 52. The module 40 includes an inlet 54 to which is attached a vacuum line 56. The line 56 is attached to a hazardous waste removal system 58, such as the brake waste removal system, for example purposes only, disclosed in Ser. No. 001,075, incorporated herein by reference.

In general, the waste removal system 58 will include an enclosure 60, which in this case is adapted to be secured to and sealingly enclose an automobile brake (not illustrated). The brake includes asbestos and hazardous material and hence the enclosure 60 must be kept under negative pressure or vacuum to ensure that the hazardous material does not escape into the environment.

The hazardous material from the waste removal system 58 enters the module 40 through the inlet 54. The cannister 48 includes a collection liner or bag 62, which can include an opening 64 which mates to the inlet 54. The bag 62 also could be part of the filter system and the hazardous material could also be filtered by it prior to the air entering the filter unit 44. The filter unit 44 includes a bottom opening 66 through which the air flows. The unit 44 can be formed in one or several parts.

In contrast to the vacuum 10, the HEPA-type filter 42 is not directly exposed to the hazardous material, but instead the filter unit 44 includes at least a first prefilter 68. The prefilter 68 generally will be a very inexpensive polyester and/or fiberglass filter, which also is adapted to prevent any significant amount of moisture from passing therethrough.

A second prefilter 70 also could be utilized if desired to further prevent moisture or hazardous material from clogging the HEPA-type filter 42. This filter assembly further allows a more inexpensive HEPA-type filter 42 to be utilized, further decreasing the cost of the system. The filter unit 44 is coupled to an outlet 72 in the lid 46, through the HEPA-type filter 42. The outlet 72 further includes a vacuum line 74, which is coupled to an inlet 76 of a conventional vacuum unit 78, such as a standard shop vacuum.

Thus, the module 40 eliminates direct exposure to the HEPA-type filter 42, allowing a more inexpensive HEPA-type filter 42 to be utilized and further eliminates the expensive custom HEPA-type filter vacuum apparatus 10 of the prior art. The module 40 further includes several other enhancements over the prior art vacuum 10.

The bag 62 can be attached to a ring 80 which is clamped between the lid 46 and the cannister 48 for easy insertion, sealing and removal of the bag 62. The module 40, further preferably includes a pressure switch (not illustrated), which will shut-off the vacuum 78 when the pressure drop increases to a predetermined level across the filter unit 44, which indicates that one or more of the filters 68, 70 and 42 are clogged. This prevents the HEPA-type filter 42 from being blown out.

Further, the module 40 can include a fume hood 82 to prevent release of hazardous materials when the bag 62 is replaced. The fume hood 82 can include one or more upstanding standards or rods 84 attached to the cannister 48 and having a ring 86 at an upper end thereof. The ring 86 will support a depending bag or skirt 88 which hangs down around the module 40. The skirt 88 can include one or more openings or slits (not illustrated) to allow the lines 56 and 74 to pass therethrough and to allow a worker to remove and replace the bag 62. The module 40 also preferably is mobile and includes a plurality of rollers or wheels 90.

Many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A HEPA-type filter, comprising:
a vacuum cannister body, having an inlet opening therein and adapted to contain a replaceable vacuum liner therein and a lid sealingly and pivotably mounted on an open portion of said cannister body;
said lid including an outlet opening therein and communicating with said inlet opening through a filter unit including at least a HEPA-type filter adjacent said outlet opening and two prefilters between said HEPA-type filter and said inlet opening to protect said HEPA-type filter, said prefilters mounted adjacent one another and said HEPA-type filter; and
and a fume hood having a wall depending over said cannister body to prevent hazardous materials from escaping to the environment when the liner is replaced.

2. The module as defined in claim 1 wherein said fume hood includes at least one upstanding standard supported by said cannister body and said standard supporting said depending fume hood wall, said wall having openings therein through which lines can be connected to said cannister body inlet and outlet openings.

3. The module as defined in claim 1 including a source of vacuum separate from said cannister body coupled to said outlet opening to provide a negative air pressure flow from said inlet opening through said filter unit to said outlet opening.

4. The module as defined in claim 3 including a pressure switch for turning off said source of vacuum when the pressure drop across said filter unit exceeds a predetermined value.

5. A HEPA-type filter vaccum waste removal system, comprising:
a HEPA-type filter, including a vacuum cannister body, having an inlet opening therein and adapted to contain a replaceable vacuum liner therein and a lid sealingly and pivotably mounted on an open portion of said cannister body;
said lid including an outlet opening therein and communicating with said inlet opening through a filter unit including at least a HEPA-type filter adjacent said outlet opening and two prefilters between said HEPA-type filter and said inlet opening to protect said HEPA-type filter and a fume hood having a wall depending over said cannister body to prevent hazardous materials from escaping to the environment when the liner is replaced;

said inlet opening coupled by a vacuum line to a waste removal system having hazardous material therein; and said outlet opening coupled to a separate vacuum source by a vacuum line.

6. The module as defined in claim 5 wherein said fume hood includes at least one upstanding standard supported by said cannister body and said standard supporting said depending fume hood wall, said wall having openings therein through which lines can be connected to said cannister body inlet and outlet openings.

7. The system as defined in claim 5 including a pressure switch for turning off said source of vacuum when the pressure drop across said filter unit exceeds a predetermined value.

* * * * *